Patented Dec. 12, 1933

1,938,981

UNITED STATES PATENT OFFICE 1,938,981

METHOD OF PREPARING CORN FOR POPPING

Cloid H. Smith, Sioux City, Iowa, assignor to American Pop Corn Company, Sioux City, Iowa, a corporation of Iowa No Drawing. Application September 26, 1932
Serial No. 634,983

3 Claims. (Cl. 99—11)

The object of this invention is to provide an improved method of preparing pop corn for popping, this method relating particularly to the controlling of the moisture content, thus insuring that the kernels of pop corn will contain the proper percentage of moisture so that when heat is applied a maximum volume of popped corn will be secured from a given volume of raw pop corn.

More specifically, the invention relates to an improved method of preparing pop corn for popping by the removal or addition of moisture while the pop corn is in the ear, in order that the individual kernels may possess the proper amount of moisture for obtaining the best results when popped, and then immediately removing the kernels from the cob in such manner that the enamel is not cracked or broken.

My invention consists in the method or series of steps hereinafter set forth and pointed out in the claims.

For a long time it has been known that in preparing pop corn for popping, particularly where this is done, on a large scale for commercial sale, it develops that there is a great deal of difference in the volume of popped corn that can be produced from a given volume of raw or unpopped corn.

For example, under some circumstances, the volume is from twenty-eight to thirty quarts of popped corn from one quart of raw pop corn, which is a maximum volume produced from pop corn having the correct amount of moisture; but at times the volume of popped corn will drop as low as fourteen quarts, because of the fact that the moisture content of the kernels is very low.

When a maximum volume of popped corn is secured there is of course a minimum of waste in the shape of unpopped or imperfectly popped kernels, running as low as one eighth of an ounce to the quart. As the volume of popped corn decreases, on account of using imperfectly cured pop corn, or pop corn not having the proper moisture content, the amount of waste or unpopped kernels is correspondingly higher.

It has been known in a general way that the condition of the pop corn as to moisture content has something to do with its popping ability. Usually this was recognized by drying the corn to reduce the moisture content, but it was not known that there was what might be called a critical point, beyond which the drying might be detrimental to popping quality. So far as I am aware, no one else heretofore has ever thought of adding moisture to corn. Sometimes the corn was dried on the cob and sometimes as shelled corn, and there was no recognition of any virtue in doing the one over the other. It was not known that it was desirable to bring the corn to the proper moisture content on the ear and to shell the corn at the time it had the proper moisture content. Ordinarily most pop corn has either too much moisture or too little moisture.

I have found that the best results are secured from pop corn having a moisture content ranging from twelve to thirteen per cent.

After long and extensive experiments I have discovered a method whereby the moisture content of the pop corn can be accurately controlled, such control involving the increase or decrease of the moisture content of the pop corn to the desired point.

Heretofore the only attempts to control the moisture content of pop corn have been made in connection with the drying of shelled pop corn and such methods are not satisfactory because they tend to cook the pop corn, with the result that it will not pop properly.

I have found that it is exceedingly difficult to control the addition or removal of moisture after the pop corn is shelled. Moisture is added or removed through the end of the kernel where it is attached to the cob.

When pop corn, and particularly shelled pop corn, is subjected to heat for drying or removing moisture, the starch is likely to undergo a change in its chemical composition and then the corn will not pop at all. This is particularly true when it is attempted to dry the pop corn too rapidly. It is difficult to add moisture to shelled pop corn without developing mould.

After much experimenting I found that by leaving the pop corn on the cob and subjecting it to moisture for a proper length of time, the pith in the cob will take up moisture from the atmosphere and this moisture will be fed to the individual kernels of pop corn through the minute opening at the point where the kernels are attached. Conversely, moisture can be extracted from the pop corn by subjecting it to moderately heated dry currents of air while still on the cob, the moisture being drawn from the kernels through the pith of the cob and thence discharged into outside air.

The minute opening at the base of the kernel of pop corn is the only means of communication between the interior of the kernel and the outside atmosphere. When the kernel is still on the cob there is a sort of a wick-like substance which connects this minute opening with the pith of the cob. The pith is of a spongy nature and acts as a transferring medium to take on or give off moisture, thus tending to equalize the moisture content of the individual kernels with the prevailing moisture content of the surrounding atmosphere.

In other words—I have discovered that the moisture content of the pop corn while still on the cob can readily and accurately be controlled by controlling the conditions of humidity in the atmosphere to which the ear pop corn is exposed. If it is known that the pop corn contains too much moisture, then the desired amount of moisture can be withdrawn by exposing it to atmosphere having a relatively low humidity. This step is aided by the application of a moderate amount of heat to the air. On the other hand—if the pop corn is found to contain too little moisture, then its moisture content can be readily increased to the desired extent by subjecting the ear pop corn to the influence of relatively damp air.

It is true as discovered by experiment, that the process of adding or removing moisture is slow and that it varies with different varieties of pop corn, but it is also true that under all conditions and with all varieties of pop corn, the moisture content can be much more accurately regulated and controlled with pop corn on the ear than with shelled pop corn.

I have also discovered that the pop corn which has been brought to the desired moisture content should be immediately shelled. If it is permitted to remain on the cob, the cob may take on or give off moisture and thus cause the moisture content of the pop corn to vary from the desired amount necessary for perfect popping. This, as before stated, is due to the fact that the pith of the cob acts as a medium by which moisture is transferred readily either to or from the kernel, by means of the wick-like substance connecting the minute opening of the kernel with the pith of the cob. This tends to equalize the moisture content of the kernels with that of the cob and ultimately with the prevailing humidity of the atmosphere. This is not true when the kernels have been removed from the cob because the moisture transferring medium is then absent and the only communication that the interior of the kernel then has with the surrounding atmosphere is by way of the minute opening at its base, and I have found that there is not such a ready passage of moisture through this opening after the pop corn has been shelled.

Preferably the pop corn is placed in hermetically sealed, air tight containers or in moisture proof containers as soon as it is shelled, so that the perfect popping condition is retained.

I have also found that the proper method of shelling the ear pop corn is an important factor.

In connection with the thought and desirability of controlling the moisture in the pop corn, I may say that the starchy interior of the kernel is composed of an infinite number of minute cells.
In the popping operation the moisture in these cells is turned into steam by the application of heat and it is the expansion of this steam which causes the corn to pop through a sort of explosive action. To obtain the maximum popping effect it is, of course, necessary that the shell around the kernel, composed of its natural enamel, be intact. Otherwise there will be an escape of a greater or less portion of the steam, with the result that only a partial number of the cells explode and there is only an incomplete bursting of the enamel shell and enlargement of the starchy interior.

For example, I have found that shelling pop corn on the type of shellers generally used breaks or cracks the enamel on enough of the kernels to substantially reduce the volume of popped corn that should be produced from a given quantity of raw pop corn. This reduction may be due to the escape of moisture before popping, through the cracks or breaks in the enamel, and is probably more largely due to the fact that when the pop corn is heated for popping, the moisture gradually evaporates through these cracks or breaks instead of forming steam and bursting the kernel with the desired explosive effect.

For this reason it is very important that the shelling should be done in such a way as to avoid cracking or breaking of the enamel.

My invention therefore consists primarily in a method which makes possible the intelligent control of the moisture content of the pop corn by bringing this moisture to the predetermined desirable percentage, immediately removing the kernels from the ears, in order that there may be no marked subsequent change in the moisture content, and accomplishing this removal of the kernels in a manner that prevents damage to the enamel of the kernels of pop corn. When all of these factors are observed in the preparation of the pop corn for popping it is found that the maximum volume of popped corn may be obtained from a given volume of raw pop corn.

Any suitable equipment or apparatus may be employed for carrying out the steps relating to the control of the moisture content of the pop corn, due regard being had to proper means for supporting the ears of pop corn, for controlling the passage of air currents and for controlling the humidity of the air currents.

Suitable tests should be made at regular intervals to determine the moisture content of the pop corn. These tests ordinarily can best be made by taking samples of the ear pop corn at regular intervals, removing the kernels from the cobs and determining the moisture content. If desired, the samples may be popped to determine the volume of popped corn which can be obtained therefrom. The pop corn on the cob is subjected to currents of air having suitable relative humidity in respect of the moisture content of the pop corn and carrying on this operation until such time as the pop corn is found by test to have reached the maximum popping ability.

When I say that the corn on the cob is subjected to the influence of atmosphere having the proper relative humidity, I mean that in case it is desired to remove moisture from the pop corn the air currents are of low humidity and act to absorb or take up moisture from the pop corn through the pith of the cob. On the other hand, when it is found necessary to add moisture to the pop corn, the atmospheric currents of air passing through the ear pop corn are supplied with an excess of moisture and some of this moisture is fed to the kernels through the pith of the cob and the wicks connecting the pith of the cob with the minute openings of the kernels.

During the process of increasing or decreasing the moisture content of the pop corn, it is necessary to occasionally shift the position of the ears in order that the air currents may have ready access to the base ends of all of the ears, or in other words—may have contact with the pith of the cob which is the medium by which the moisture is transferred to or from the kernels.

When it is found that the pop corn under treatment has reached the maximum of popping ability, then the kernels are immediately removed from the cob by any suitable means which will not injure the enamel. One method of doing this is by hand shelling. If a sheller is used it should be of such construction and so operated as to avoid breaking or cracking the enamel of the kernels of pop corn.

Under such circumstances, by careful and regular testing and regulation of the humidity of the air currents to which the ear pop corn is subjected, I can accurately control the moisture content of the kernels of raw or unpopped corn so as to uniformly produce a maximum amount of popped corn from a given amount of raw or unpopped corn. In addition, these favorable conditions can be retained to a maximum extent by immediately shelling the pop corn so that further changes of the moisture content will not readily take place and by doing this in such manner that the enamel is uninjured.

I do not desire in all my claims to limit myself to attaining the proper moisture content while the pop corn is on the ear, although I prefer treating the pop corn for moisture before shelling.

I claim as my invention:—

1. A method of preparing pop corn for securing the maximum volume of popped corn from a given volume of raw pop corn, comprising increasing or decreasing the moisture in the pop corn by subjecting pop corn in the ear to moistening or drying action until the kernels have the desired moisture content giving the maximum volume of popped corn and thereafter removing the kernels of pop corn from the cob, before any further substantial passage of moisture between kernels and cob.

2. A method of preparing pop corn for popping comprising subjecting the pop corn in the ear to currents of air having proper relative humidity with respect to the predetermined moisture content of the pop corn, and thereby bringing the moisture content to approximately 12 to 13 percent and thereafter removing the kernels from the cobs before further substantial passage of moisture between kernels and cobs.

3. The method of preparing pop corn for popping, comprising subjecting the pop corn in the ear to positively controlled currents of air having proper relative humidity until the pop corn has a moisture content of approximately twelve to thirteen per cent, then immediately shelling the corn and packing it in moisture proof containers.

CLOID H. SMITH.